United States Patent [19]

Bartha et al.

[11] Patent Number: 4,775,648

[45] Date of Patent: Oct. 4, 1988

[54] HEAVY CERAMIC SHAPED MATERIAL, PROCESS FOR THE PRODUCTION THEREOF AND THE USE THEREOF

[76] Inventors: Peter Bartha, Greifswalderstr. 2, 3406 Bovenden; Guido Weibel, Kleine Strasse, 3515 Dankelshausen, both of Fed. Rep. of Germany

[21] Appl. No.: 891,958

[22] Filed: Aug. 1, 1986

[30] Foreign Application Priority Data

Aug. 2, 1985 [DE] Fed. Rep. of Germany ....... 3527789

[51] Int. Cl.[4] .................... C04B 35/04; C04B 35/06
[52] U.S. Cl. ............................... 501/112; 501/113; 501/114; 501/117; 501/118; 501/120; 501/132
[58] Field of Search ............... 501/108, 109, 110, 111, 501/112, 113, 114, 115, 116, 117, 118, 119, 120, 121, 132

[56] References Cited

U.S. PATENT DOCUMENTS

| | | | |
|---|---|---|---|
| 4,097,291 | 6/1978 | Huseby et al. | 501/120 |
| 4,125,407 | 11/1978 | Ueno | 501/117 |
| 4,348,485 | 9/1982 | Oohasi et al. | 501/120 |
| 4,647,547 | 3/1987 | Singh et al. | 501/117 |

FOREIGN PATENT DOCUMENTS

| | | | |
|---|---|---|---|
| 2249814 | 5/1973 | Fed. Rep. of Germany . | |
| 1333379 | 10/1973 | United Kingdom | 501/115 |

*Primary Examiner*—Steven Capella
*Assistant Examiner*—Anthony J. Green
*Attorney, Agent, or Firm*—Hill, Van Santen, Steadman & Simpson

[57] ABSTRACT

Heavy ceramic shaped material with a content of at least one of the components magnesia, fired dolomite, chromite and spinel, characterized by a microcrack system substantially homogeneously distributed in the shaped material structure, as well as process for producing such a heavy ceramic shaped material and the use thereof.

6 Claims, 4 Drawing Sheets

HEAVY CERAMIC SHAPED MATERIAL, PROCESS FOR THE PRODUCTION THEREOF AND THE USE THEREOF

FIELD OF THE INVENTION

The present invention relates to a heavy ceramic shaped or moulded material containing at least one of the components magnesia, fired dolomite, chromite and spinel, a process for producing a heavy ceramic shaped or moulded material with a content of at least one of the components magnesia, fired dolomite, chromite and spinel, in that by mixing or mixture formation initially a total shaped or moulded material mixture is prepared and this then undergoes a firing process, as well as the use of such a shaped or moulded material.

DESCRIPTION OF THE PRIOR ART

Heavy ceramic shaped materials, particularly basic refractory materials based on magnasite, dolomite, chromite and/or spinel, are used in all high temperature processes with basic slag attack, such as e.g. in the production of cement, lime, dolomite, iron and steel, as well as in non-ferrous metal production and in the glass industry as a lining material for furnaces, kilns and vessels. In the case of high refractoriness and good chemical resistance, such materials or shaped materials suffer from high brittleness, i.e. a high modulus of elasticity, so that there are negative influences on the life with respect to thermal expansion stresses, mechanical stressing and spalling resistance. The influence of the modulus of elasticity on the thermal expansion stresses can be described according to Hook by the following equation:

$$\sigma_D = E_D \cdot \Delta\theta \cdot \alpha \tag{1}$$

$\sigma_D$: compression stress [N/mm$^2$]
$E_D$: modulus of elasticity [kN/mm$^2$]
$\Delta\theta$: temperature difference [°C.]
$\alpha$: thermal expansion coefficient [°C.$^{-1}$]

The influence of the modulus of elasticity on the mechanical stressing, such as e.g. occurs in rotary kilns can be described, according to Meedom by the following equation:

$$\sigma_D = \frac{3}{4} \cdot \frac{\omega_s \cdot h}{R_o^2} \cdot E_D \tag{2}$$

$\sigma_D$: compression stress [N/mm$^2$]
$\omega_s$: kiln shell ovality [mm]
h: refractory lining thickness [mm]
$R_o$: kiln shell diameter [mm]
$E_D$: modulus of elasticity [kN/mm$^2$]

The influence of the modulus of elasticity on the spalling resistance can be gathered from the following equation:

$$R_{TWB} = \frac{\sigma(1-\mu)}{E_D} \cdot \frac{\alpha \cdot \lambda}{C\rho} \tag{3}$$

$R_{TWB}$: spalling resistance
$\sigma$: strength [N/mm$^2$]
$\mu$: Poisson's ratio
$E_D$: modulus of elasticity [kN/mm$^2$]
$\alpha$: thermal expansion coefficient [°C$^{-1}$]
$\lambda$: thermal conductivity [kJ/mh °C.]
C: specific heat [kJ/kg °C.]
$\rho$: bulk density [g/cm$^3$]

The above three equations show that a low modulus of elasticity is of considerable importance for the life behaviour of basic refractory materials.

It is already known to reduce the high thermal expansion stresses of basic refractory products or shaped materials by laying the refractory bricks with interposed mortar or cement joints, metal inserts, such as metal sheets, perforated sheets or nettings. Metal inserts and thermal expansion stress-reducing brick shapes form the subject matter of numerous publications, e.g. ZKG, vol. 7, 1976, pp. 298–304.

Numerous measures have been taken in the past to improve the spalling resistance of basic, refractory materials. On the one hand the particle size distribution was modified. J. H. Chesters ("Herstellung and Eigenschaften basischer und neutraler Baustoffe (außer Dolomiterzeugnissen)", in Harders/Kienow, Feuerfestkunde-Herstellung, Eigenschaften und Verwendung feuerfester Baustoffe, Springer-Verlag 1960, chapter 5.5, pp.754/755) established that the spalling resistance of chromium magnesia bricks can be significantly improved by the so-called miscibility gap, i.e. minimizing the middle grain proportion (0.2 to 0.6 mm). However, a decisive disadvantage of the miscibility gap is on the one hand that its action is only sufficient in conjunction with a spalling resistance component such as e.g magnesia in chromium magnesia bricks or chromium ore in magnesia chromium bricks. On the other hand through the use of the miscibility gap, it is not possible to achieve an optimum particle packing density, as is desired for achieving a high infiltration resistance against slags. Haase und Petermann ("Untersuchungen über die Temperaturwechselfestigkeit, insbesondere uber die Dehnungseigenschaften feuerfester Baustoffe", Silikattechnik 7, no. 12, 1956, pp.505–510, VEB Verlag Technik/Berlin) propose a particle size distribution according to Litzow and firing the bricks at low temperature. However, the decisive disadvantage of this is that the temperature of use of these bricks is generally well above the proposed low firing temperature, so that there is a resintering of the brick tops and consequently a loss of spalling resistance.

Therefore, for improving the spalling resistance of basic, refractory materials, the addition of chromium ore has already been described (e.g. Harders/Kienow, Feuerfestkunde-Herstellung, Eigenschaften und Verwendung fueuerfester Baustoffe, Springer-Verlag 1960, chapter 5.5, p.755), whereby in particular the chromium ore quantity and the optimum particle size fraction of the chromium ore were defined. To obtain an adequate spalling resistance, chromium ore quantities between 15 and 30% by weight are required, but in combination with the miscibility gap at least 10% by weight. As a result spalling resistance-optimized brick qualities reach moduli of elasticity down to 25 kN/mm$^2$, compared with the approximately 60 to 100 kN/mm$^2$ of pure magnesia bricks. The action of chromium ore as a spalling resistance component is described by W. Späth ("Zur Temperaturwechselbeständigkeit feuerfester Stoffe", RADEX RUNDSCHAU, vol. 1960-1961, pp.673–688 Österreichisch-Amerikanische Magnesit Aktiengesellschaft, Radenthein/Kärnten) and explained it by textural stresses due to different thermal expansion coefficients between the magnesia and the chromium ore. The vital disadvantages of the use of chromium ore as the spalling resistance component are, however, that on changing the furnace atmosphere (Redox), material fatigue occurs (due to the presence of metals, which can occur in several valency stages, namely iron and chromium), that due to the oxidation under the catalytic action of alkalis the chromium oxide present in trivalent form in the chromium ore is converted into toxic hexavalent chromium oxide with all the resulting industrial hygiene and removal/disposal problems, that the chromium ore in part contains considerable gangue quantities, so that when using very pure synthetic magnesia, the otherwise possible precise setting of the chemism is made impossible and that finally slag infiltration leads to the chromium ore being attacked and consequently the spalling resistance component dissolved causing a spalling resistance loss.

Therefore at an early data attempts were made (Austrian Pat. No. 158 208) to add alumina powder, corundum and aluminium powder to magnesia bricks for improving the spalling resistance, spinel being formed in situ on the brick edge. The spinel formed is concentrated in the matrix and in part does not completely react, so that when such bricks are attacked by slag, the matrix decisive for the strength is destroyed. In addition, the attainable spalling resistance improvement is limited, because the $Al_2O_3$ proportion necessary to obtain a decisive improvement must be well over 8% by weight. However, this is not possible due to the marked expansion of the brick due to the volume increase in the matrix, because otherwise the dimensional accuracy and mechanical strength would be too low and the porosity too high.

A significant improvement to the spalling resistance and chemical resistance of magnesia bricks could only be achieved through the adding of presynthesized magnesium aluminium spinel in the form of sintered or molten spinel, the normal quantities added being between 15 and 25% by weight. As a result the modulus of elasticity could be lowered to approximately 20 kN/mm$^2$, the effect of said spalling resistance component also being due to a textural stressing. Although as a result of the use of presynthesized magnesium aluminium spinel the spalling resistance could be increased from approximately 60 to 100 quenchings and the chemical resistance to alkali and slag attack was significantly improved, there are still disadvantages regarding the still existing reaction readiness of the spalling component with slags and the resulting possible spalling resistance loss, the need of laying the bricks with mortar or metal inserts and finally the sensitivity to kiln shell ovality in the rotary kilns.

German Pat. No. 22 49 814 describes the use of zirconium dioxide as a spalling resitance component. An optimum spalling resistance through adding zirconium dioxide is achieved at approximately 3% by weight. The vital disadvantage is that at the optimum zirconium dioxide addition quantity, the spalling resistance is max. 60 quenchings at a modulus of elasticity of approximately 25 kN/mm$^2$, the number of attainable quenchings dropping again on adding further zirconium dioxide.

It is also known to achieve a very high spalling resistance in the case of magnesia carbonate bricks and this is due to the high thermal conductivity of the graphite proportion, as can be gathered from equation (3). The decisive disadvantage of such bricks is that their use is limited to units in which a reducing furnace or kiln atmosphere prevails and their high thermal conductivity is undesired for many uses.

It was finally established during the development of dense, oxide-ceramic high temperature materials that through partly stabilizing zirconium dioxide or by zirconium dioxide additions to aluminium oxide materials the spalling resistance can be improved. Microscopic analyses have revealed that a microcrack system homogeneously distributed in the structure and/or the resulting modulus of elasticity reduction can be made responsible for this, as was described by Hasselmann ("Rolle der Bruchzähigkeit bei der Temperaturwechselbeständigkeit feuerfester Erzeugnisse" Berichte der Deutschen Keramischen Gesellschaft, 1977, vol. 54, Verlag Der Deutschen Keramischen Gesellschaft. 5340 Bad Honnef 1, pp.195-201). However, it is not possible to transfer the measures described therein to refractory bricks or heavy ceramic shaped materials (P. Tassot, "Phasenbeziehungen in den Systemen $Al_2O_3$—$Cr_2O_3$—$ZrO_2$, MgO—$Cr_2O_3ZrO_2$ und MgO-$Al_2O_3$—$ZrO_2$ zwischen 1600 und 1900° C. und ihre Bedeutung für die Herstellung hochfeuerfester Werkstoffe", Christian Albrechts University, Kiel Thesis 1983). It has been found that the processes used in dense oxide ceramics cannot be transferred to the heterogeneous structure of heavy ceramic, basic shaped articles. Thus, the addition of very fine metal particles with diameters below 10 $\mu$m, as proposed by Rossi (Ronald C. Rossi "Thermal-Shock-Resistant Ceramic Composites" The American Ceramix Society BULLETIN, 1969, vol. 48, 4055 North High Street, Columbus, Ohio 43214, pp.736 and 737) for hot-pressed magnesium oxide, can neither change the spalling resistance, nor the modulus of elasticity of the heavy ceramic shaped materials produced therefrom.

SUMMARY OF THE INVENTION

The problem of the present invention is to provide a heavy ceramic shaped material of the aforementioned type, particularly for refractory purposes, as well as a process for the production thereof and which, due to a low modulus of elasticity, is resistant to both mechanical and thermal stresses and also does not lose its high spalling resistance in the case of a slag attack.

According to the invention, this problem is solved in a heavy ceramic shaped material of the aforementioned type by a microcrack system substantially homogeneously distributed in the shaped material structure.

According to a particular embodiment of the invention, the microcrack system is based on the addition of a microcrack initiator to the overall shaped material mixture used for producing the shaped material prior to the firing process for the latter. The microcrack initiator can be in the particle size fraction <3 mm.

The invention also proposes that the microcrack initiator has at least one spinel forming agent and accompanied by expansion during the firing process forms minerals of the system $R_{2+}O.R_2{}^{3+}O_3$, in which $R^{2+}$ can be Mg and/or Fe and $R^{3+}$ can be Al, Cr and/or Fe, whilst incorporating the physical quantity of said metals, as well as their oxides, suboxides, hydroxides and/or salts.

According to the invention, the ratio of $R^{2+}O$ to $R_2{}^{3+}O_3$ can be set in such a way that during the firing process, the proportion of stoichiometric spinel or mixed spinel is at least 75% by weight.

According to the invention, the overall shaped material mixture has a microcrack initiator content of 3 to 10% by weight when using oxides or the corresponding mass equivalent based on oxides when using suboxides, hydroxides and/or salts for $R^{2+}$ and/or $R^{3+}$.

According to the invention, the overall shaped material mixture has a microcrack initiator content of 2.5 to 10% by weight.

The invention also proposes that the overall shaped material mixture has a microcrack initiator content of 5 to 8% by weight.

Another embodiment of the invention is characterized in that when simultaneously using conventional components increasing the spalling resistance (spalling resistance components), the microcrack initiator proportion is between 0.5 and 10% by weight when using oxides or the corresponding mass equivalent, based on the oxides when using suboxides, hydroxides and/or salts.

According to the invention, the microcrack initiator is present in the size fraction 0.1 to 3.0 mm, preferably up to 1.5 mm of the overall shaped material mixture.

Alternatively the invention proposes that the microcrack initiator has at least one oxide forming agent as a metal, metal oxide, metal suboxide, metal hydroxide and/or metal salt and accompanied by expansion, during the firing process forms oxides of the metals Al, Mg, Fe and/or Cr or higher oxides of the suboxides FeO and/or CrO.

The overall shaped material mixture can have a content of microcrack initiator from the metals Al, Mg, Fe and/or Cr and/or their suboxides and/or their salts of 0.5 to 5% by weight.

According to another embodiment of the invention, when simultaneously using conventional spalling resistance components, the microcrack initiator proportion is between 0.25 and 5% by weight of the overall shaped material mixture.

The invention also proposes that the microcrack initiator is present in the particle size fraction 0.1 to 1 mm, preferably 0.1 to 0.5 mm of the overall shaped material mixture.

According to another embodiment of the invention, the microcrack initiator has at least one silicate forming agent as a metal oxide, metal hydroxide and/or metal salt and, accompanied by expansion, during the firing process forms calcium, magnesium and/or calcium magnesium silicates.

According to the invention it is also possible for the microcrack initiator to have a strongly shrinking or contracting component in the powder fraction <0.06 mm of the overall shaped material mixture.

According to the invention, the strongly shrinking component can have caustic magnesia or caustic dolomite powder and/or caustic spinel with a fines proportion of 90% <0.06 mm.

Finally, the invention optionally proposes that the strongly shrinking component is present in a proportion of 5 to 25% by weight of the overall shaped material mixture.

The inventive process for preparing a heavy ceramic shaped material of the aforementioned type is characterized in that to the overall shaped material mixture is added a microcrack initiator.

Finally, the invention also teaches the use of the heavy ceramic shaped material according to the invention as a refractory material, particularly for lining rotary kilns and the like.

The invention is based on the surprising finding that it is possible to produce a shaped material or refractory brick of the aforementioned type which, due to a low modulus of elasticity, is resistant both to mechanical and thermal stressing and also does not lose its high spalling resistance as a result of slag attacks, that a microcrack initiator with a much larger diameter than in the case of the dense, oxide-ceramic high temperature materials is homogeneously distributed in the shaped material structure, the mechanism either being due to the fact that during the firing process for brick sinter firing, it either initiates an expansion of the particular particles, i.e. a volume-increasing reaction, the microcrack system forming in the adjacent other particles, or a strong shrinkage is brought about in the powder fraction, which once again leads to the described microcrack system in the other particles of the mixture. The effect obtained is dramatic, because as a result of the measures according to the invention the modulus of elasticity of heavy ceramic shaped materials or refractory bricks of the aforementioned type can be lowered to 12.5 kN/mm$^2$.

BRIEF DESCRIPTION OF THE DRAWINGS

Further features and advantages of the invention can be gathered from the claims and the following description, where an embodiment is described in detail relative to the drawings. In the drawings show:

DESCRIPTION OF THE PREFERRED EMBODIMENTS

In the selected example, magnesia and alumina according to the following table 1 were mixed in a stoichiometric ratio corresponding to magnesium aluminate and shaped to mixture particles between 0.1 and 3 mm.

TABLE 1

|  | MAGNESIA | ALUMINA |
| --- | --- | --- |
| MgO | 97.0 | — |
| Al$_2$O$_3$ | 0.2 | 99.3 |
| CaO | 1.8 | — |
| SiO$_2$ | — | 0.04 |
| Fe$_2$O$_3$ | 0.6 | 0.03 |
| Na$_2$O | — | 0.3 |
| Acid-insoluble | 0.4 |  |

A basic batch of sintered magnesia with the maximum particle size of 4 mm and a particle size distribution according to the Fuller curve was mixed with inventive microcrack system mixture particles in proportions of 3 to 9% by weight of different particle size fractions. The mixtures were mixed with the necessary lignin sulphonate quantity, compacted at a specific compacting pressure of ≧1200 kp/cm$^2$, dried and fired at a sintering temperature above the magnesium aluminium spinel formation temperature and in the present embodiment namely at 1650° C.

Figure 1:
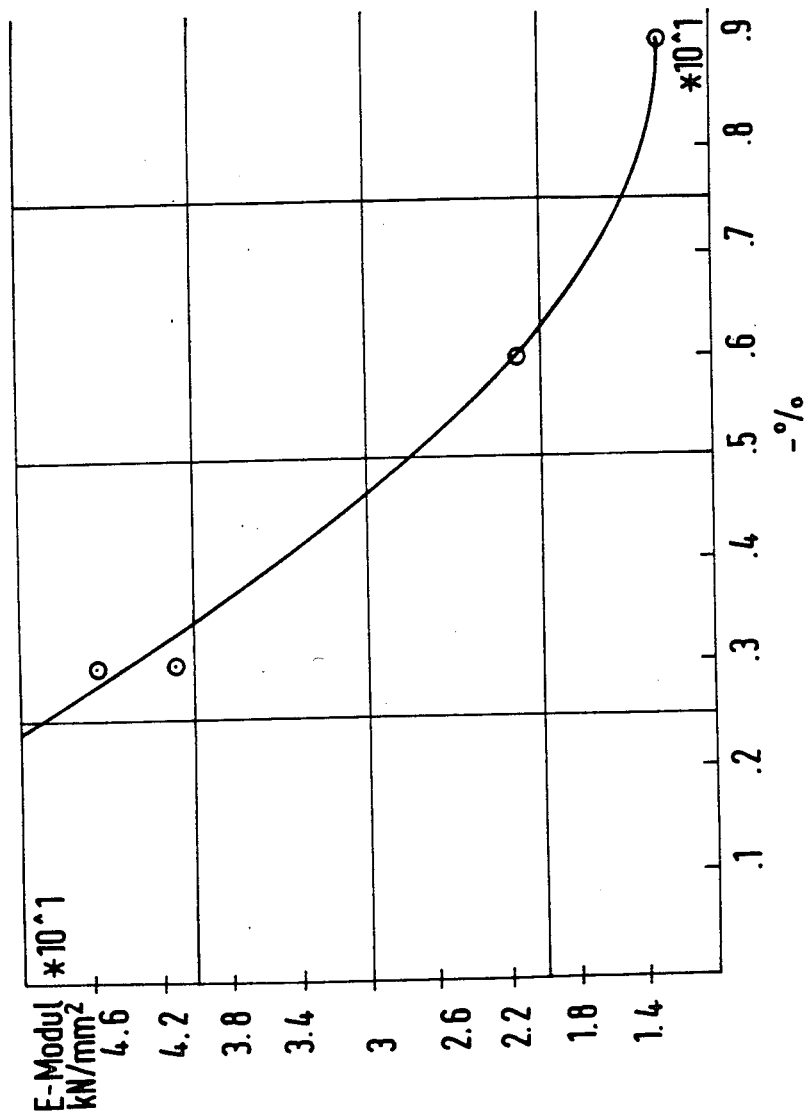
FIG. 1 For the selected embodiment, the modulus of elasticity obtained as a function of the microcrack initiator quantity.
Figure 2:
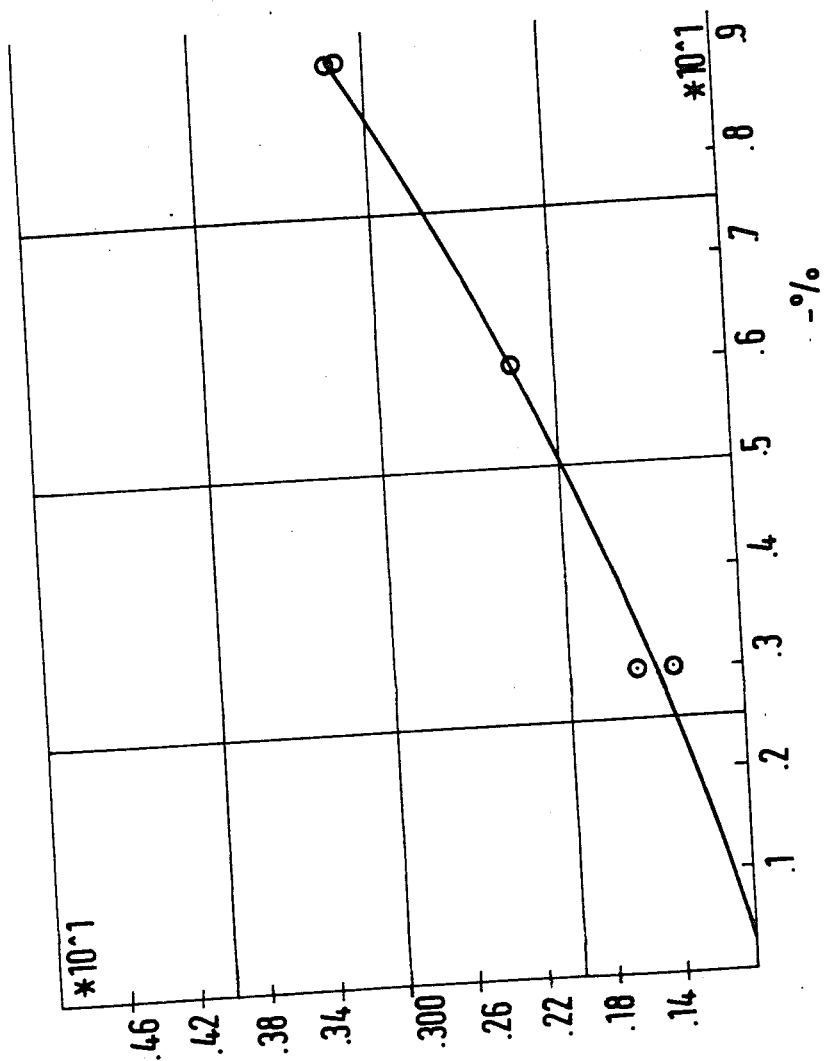
FIG. 2 The spalling resistance (KDF/E modulus) as a function of the microcrack initiator quantity.
Figure 3:
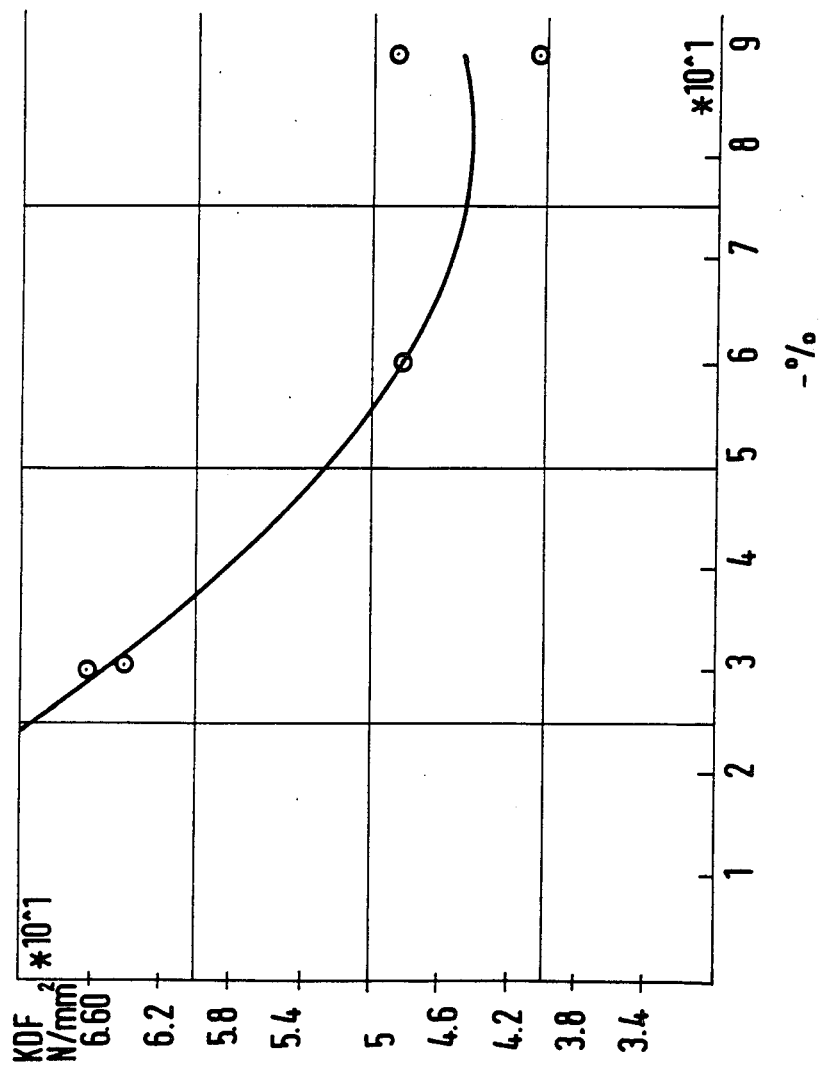
FIG. 3 The KDF as a function of the microcrack initiator quantity.
Figure 4:
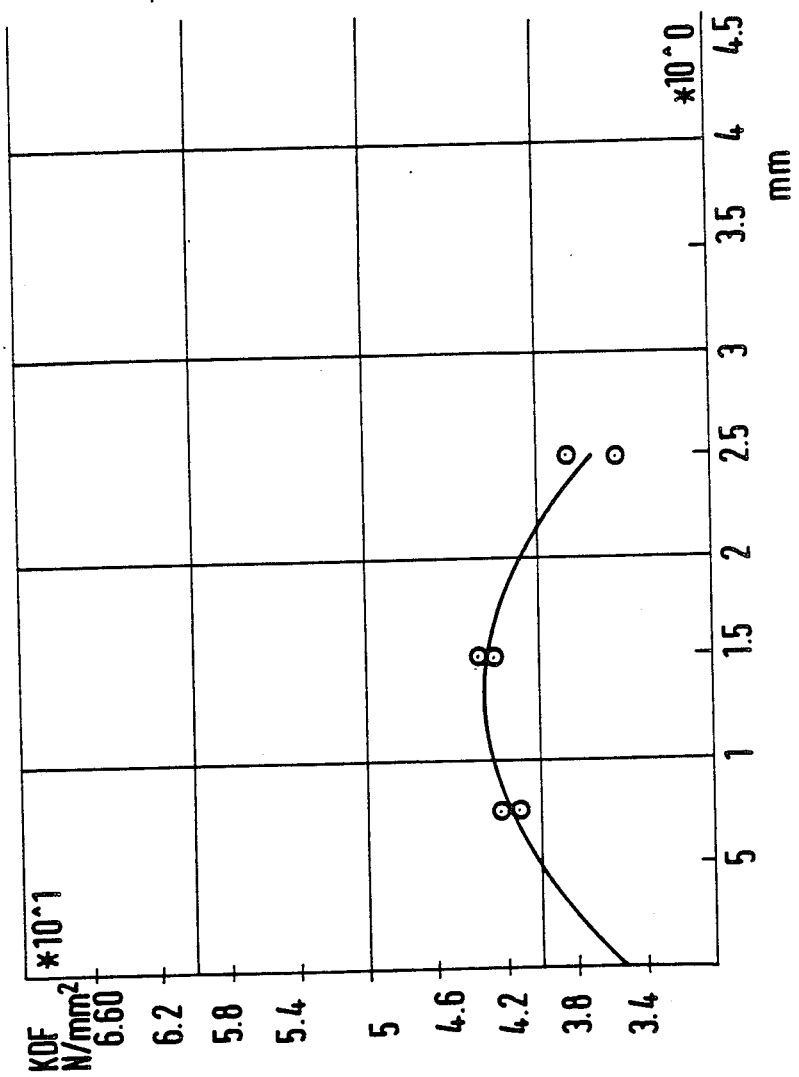
FIG. 4 The KDF as a function of the mean particle diameter of the microcrack initiator.

The physical characteristics obtained as a function of the added quantity and the particle size fraction of the microcrack initiator are shown in FIGS. 1 to 4. It can be gathered therefrom that the modulus of elasticity or the KDF can be varied within wide limits and is directly dependent on the quantity of the microcrack initiator used according to the invention. Under the limiting condition of a minimum cold compression strength of 35 N/mm$^2$ for basic refractory products, the modulus of elasticity can be reduced to 12.5 kN/mm$^2$ through a maximum added quantity of 10% by weight of the microcrack initiator according to the invention. Compared with conventional brick qualities with optimized spalling resistance this represents a modulus of elasticity reduction to almost half the values hitherto considered attainable. The spalling resistance of bricks with a modulus of elasticity of approximately 12.5 kN/mm$^2$ was so high that following 180 quenchings at 1200° C. in a cold compressed air flow still no breakage occurred. The subsequently determined strength drop was below 25%.

An important advantage of the microcrack system according to the invention is that even in the case of reactions of the microcrack initiator with slags, the spalling resistance is not negatively influenced, because the microcrack initiator has no further significance during sinter firing of a microcrack system homogeneously distributed in the brick structure. The modulus of elasticity reduction e.g. caused by a 10% microcrack initiator proportion also permits a crunching laying of such bricks, because according to equation (1) the thermal expansions stresses decrease in proportion to the modulus of elasticity. The resulting advantage is a rapid and inexpensive lining of the furnace or kiln units, because there is no need for mortars and/or metal inserts, which can represent 5 to 7% of the lining costs, although it is naturally also possible to lay refractory bricks produced according to the invention together with mortar and the like. Another advantage results from equation (2), because brick qualities with such a low modulus of elasticity as are obtainable according to the invention lead to no problems of flaking and the like, even in the case of high shell ovality of rotary kilns.

Similar results to those described hereinbefore can also be obtained with picrochromite and magnesia ferrite-forming microcrack mixture particles, as well as mixed crystals of general formula $R^{2+}O.R_2^{3+}O_3$, in which $R^{2+}$ stands for Fe and/or Mg and $R^{3+}$ for Fe, Al and/or Cr.

According to the invention, the spinel or mixed spinel proportion in the microcrack-producing mixture should be at least 75% by weight, because otherwise the action is greatly reduced and can only be compensated by an undesirably high proportion of microcrack initiator, based on the overall shaped material mixture. The microcrack mixture particles according to the invention can obviously not only be used in pure magnesia, dolomite and spinel bricks, but also in the described conventional bricks with spalling resistance forming agents such as chromium ore, alumina, spinel, zirconium oxide, etc. However, it is pointed out that the total quantity for obtaining a given spalling resistance is above the quantity of the pure microcrack initiator. Thus, the disadvantage of this combination is that the total quantity of spalling resistance forming agents (i.e. chemically less stable components) is unnecessarily high. The less stable component can be proportionately reduced to a minimum by the microcrack system according to the invention.

As claimed, it also falls within the scope of the invention to optionally use those microcrack initiators, which are compatible with the main component at high temperatures, such as calcium and magnesium silicate-forming mixtures and the compound-forming components can be present both in the form of oxides, hydroxides and/or salts. Finally, the effect obtained according to the invention can also be achieved by those microcrack initiators, in which the volume-increasing, i.e. expanding action is based not on a compound formation, but on pure oxidation (metals or unstable metal oxides). These are preferably used in the particle size fraction 0.1 to 0.5 mm, their action corresponding to the volume equivalent of the spinel-forming microcrack initiators of the above example.

According to the invention, a microcrack system can also be produced by excessive shrinkage of the matrix, in that the fines ($\leqq 0.06$ mm) are enriched with an after-shrinking magnesia type or the like. As a function of the desired spalling resistance, the proportion of the after-shrinking powder component is 5 to 25% by weight, preferably 12 to 24% by weight, based on the total quantity.

Shaped materials for refractory bricks produced according to the invention can be advantageously used wherever pronounced temperature changes and/or mechanical stress reversals occur in combination with chemical stressing by basic slags. These are, for example, sintered and transition zones of rotary kilns as used in the brick, iron and non-ferrous metal industries, as well as for melting and treatment vessels of the iron and non-ferrous metal industries, as well as extruded ceramics.

The inventive features disclosed in the description, drawings and claims can be essential to the realization of the different embodiments of the invention, either singly or in random combinations.

We claim:

1. A coarse sintered and calcined ceramic shaped body consisting essentially of at least one of the constituents magnesium oxide, fired dolomite, chromite and spinel comprising a micro-crack system substantially uniformly distributed in said shaped body, said micro-crack system resulting from the addition, prior to calcining of the entire mixture, of 0.5 to 10 weight percent of a micro-crack initiator having a grain size of 0.1 to 3.0 mm, said micro-crack initiator comprising at least one spinel forming agent which forms a spinel of the system $R^{2+}O.R_2^{3+}O_3$ during calcining, $R^{2+}$ being Mg, Fe, or mixtures thereof and $R_2^{3+}$ being Al, Cr, Fe or mixtures thereof.

2. A shaped body according to claim 1 wherein the proportions of $R^{2+}O$ to $R_2^{3+}O_3$ are such that the resulting spinel constitutes at least 75% by weight of the micro-crack initiator.

3. A shaped body according to claim 1 wherein said shaped body contains from 5 to 8 percent by weight of said micro-crack initiator.

4. A shaped body according to claim 1 wherein said micro-crack initiator has a grain size of 0.1 to 1 mm.

5. A shaped body according to claim 1 wherein said micro-crack initiator has a grain size of 0.1 to 0.5 mm.

6. A refractory ceramic brick composed of the shaped body of claim 1.

* * * * *